(12) United States Patent
Wobben

(10) Patent No.: US 6,256,212 B1
(45) Date of Patent: Jul. 3, 2001

(54) PULSE-CONTROLLED INVERTER WITH VARIABLE OPERATING SEQUENCE AND WIND POWER PLANT HAVING SUCH AN INVERTER

(76) Inventor: Aloys Wobben, Argestrasse 19, D-26607, Aurich (DE)

( * ) Notice: Subject to any disclaimer, the term of this patent is extended or adjusted under 35 U.S.C. 154(b) by 0 days.

(21) Appl. No.: 09/529,683

(22) PCT Filed: Oct. 16, 1998

(86) PCT No.: PCT/EP98/06570

§ 371 Date: Apr. 17, 2000

§ 102(e) Date: Apr. 17, 2000

(87) PCT Pub. No.: WO99/23745

PCT Pub. Date: May 14, 1999

(30) Foreign Application Priority Data

Nov. 3, 1997 (DE) .............................................. 197 48 479

(51) Int. Cl.$^7$ ...................................................... H02M 1/12
(52) U.S. Cl. ................................................ 363/40; 363/71
(58) Field of Search ............................... 363/97, 25, 134, 363/40, 71

(56) References Cited

U.S. PATENT DOCUMENTS

| | | |
|---|---|---|
| 4,190,882 | 2/1980 | Chevalier et al. ..................... 363/26 |
| 4,520,437 | 5/1985 | Boettcher, Jr. et al. ............... 363/41 |
| 5,095,416 * | 3/1992 | Ohms .................................... 363/97 |

\* cited by examiner

*Primary Examiner*—Shawn Riley
(74) *Attorney, Agent, or Firm*—Seed Intellectual Property Law Group, PLLC

(57) ABSTRACT

A pulse inverter with variable pulse frequency for producing a sinusoidal alternating current is provided, wherein the pulse frequency variation is dependent on the configuration of the alternating current to be produced, the pulse frequency at the passage-through-zero of the alternating current to be produced is a multiple greater than in the region of the maximum amplitude of the alternating, current and the lowest pulse frequency in the region of the maximum amplitude of the alternating current is at least 100 Hz. In a preferred embodiment, the pulse frequency in the region of the passage-through-zero of the alternating current to be produced is in the range of about 14–18 kHz, and in the region of the maximum amplitudes of the current it is about 500 Hz to 2 kHz. A wind power installation may be provided with a pulse inverter as described above, or alternatively, a plurality of wind power installations provided with pulse inverters as described above are connected in parallel relationship. The switching frequency of the pulse inverter is variable, dependent on the alternating current to be produced. In that respect, in the region of the passage-through-zero of the alternating current produced, the switching frequency is at a maximum and the pulse duty cycle is at a minimum. In the region of the maximum amplitudes of the alternating current, the switching frequency is at a minimum, and the pulse duty cycle is at a maximum.

5 Claims, 5 Drawing Sheets

PULSE-CONTROLLED INVERTER WITH VARIABLE OPERATING SEQUENCE AND WIND POWER PLANT HAVING SUCH AN INVERTER

BACKGROUND OF THE INVENTION

It is known in relation to wind power installations for them to be equipped with a synchronous generator and to provide an intermediate dc voltage circuit and a pulse inverter connected on the output side thereof as a frequency converter, for the variable-speed operation of the synchronous generator.

FIG. 4 is a circuit diagram illustrating the principle of such a wind power installation, wherein a variable-speed synchronous generator directly driven by the rotor is provided with a frequency converter connected on the output side thereof. In the intermediate dc circuit, firstly the variable-frequency current generated by the generator is rectified and then it is fed into the main network by way of the frequency converter.

The design configuration permits a wide range of speeds of rotation as the intermediate dc circuit provides for complete decoupling of the generator and therewith the rotor speed, from the mains frequency. The wide speed range permits effective wind-controlled operation of the rotor so that, when the design configuration is appropriate, it is possible to achieve a perceptible increase in its aerodynamically governed supply of power. It is almost self-evident that this design totally eliminates the unpleasant dynamic properties that the synchronous generator has in the event of direct connection to the mains network.

Up to a few years ago, a serious objection to the 'synchronous generator with intermediate dc circuit' system was the high level of costs and the poor overall level of electrical efficiency. Because all the electrical output flows by way of the converter, the level of efficiency in the case of old installations was basically lower than with the variable-speed generator arrangements which use the converter only in the rotor circuit current of an asynchronous generator. Modern converter technology however has made that objection substantially irrelevant. Nowadays rectifiers and converters are designed whose losses are extremely low so that the overall level of efficiency of that generator system is as in the case of double-feed asynchronous generators.

The variable-speed synchronous generator with intermediate dc circuit is therefore nowadays very widespread in wind power installation technology. In particular modern inverters have made a significant contribution in that respect. In that connection, troublesome harmonics are substantially eliminated with so-called 'pulse width-modulated (pwm) inverters'. Known pwm-inverters have a constant switching frequency or pulse duty cycle (also referred to as pulse frequency or pulse repetition rate) and the desired sinusoidal form of the alternating current to be fed in is formed by way of the ratio of the switch-on and switch-off times of two switches S1 and S2. The pulse duty cycle within which the switches S1 and S2 are switched on and off respectively is constant, as mentioned, and limited by the power loss of the inverter. In known inverters, the losses can be up to 2% or more of the total electrical output power generated, and that can be considerable in the light of the high level of costs of a wind power installation.

If the switching frequency is reduced, the power loss can admittedly be minimised but that causes an increase in the content of troublesome harmonics. If the switching frequency is increased, the power loss rises, as mentioned, but then the harmonics are very substantially eliminated.

DE 32 04 266 discloses a process and an apparatus for the operation of a pulse inverter in which an ac voltage which is synchronous with the desired inverter output voltage is compared to a delta voltage and when the two voltages are identical a change-over switching signal for the inverter switches is produced. To increase the output voltage amplitude the ratio of the control voltage amplitude and the delta voltage amplitude is raised to an over-proportional value.

DE 32 07 440 discloses a process for optimising the voltage control of three-phase pulse inverters, in which a constant dc voltage is supplied, in particular by an intermediate circuit. To optimise the voltage control of the three-phase pulse inverter, that process provides for the production of switching patterns which permit continuous adjustment of the fundamental oscillation voltage with the minimum possible harmonics effect.

Finally, DE 32 30 055 discloses a control assembly for a pulse inverter for producing an output ac voltage with a reference frequency which is predetermined by a frequency control, and a reference amplitude which is predetermined by an amplitude control voltage. The control assembly makes it possible in a simple manner to predetermine for an inverter, an output voltage which is optimised in regard to voltage utilisation and harmonics content.

Therefore the object of the invention is to provide a pulse inverter for a wind power installation, which avoids the above-mentioned disadvantages and overall reduces the power loss with a minimum content of harmonics.

BRIEF SUMMARY OF THE INVENTION

In accordance with the invention, a pulse inverter with variable pulse frequency for producing a sinusoidal alternating current is provided, characterized in that the pulse frequency variation is dependent on the configuration of the alternating current to be produced. The pulse frequency at the passage-through-zero of the alternating current to be produced is a multiple greater than in the region of the maximum amplitude of the alternating current, and the lowest pulse frequency in the region of the maximum amplitude of the alternating current is at least 100 Hz. In a preferred embodiment, the pulse inverter is further characterized in that the pulse frequency in the region in the passage-through-zero of the alternating current to be produced is in the range of about 14–18 kHz, and in the region of the maximum amplitudes of the current it is about 500 Hz to 2 kHz. In a preferred embodiment, a wind power installation is provided with a pulse inverter as described above. Alternatively, a plurality of such wind power installations as described above are connected in mutually parallel relationship.

The invention is based on the idea of moving completely away from a pulse inverter with a static switching frequency or pulse duty cycle, as is known from the state of the art and from FIG. 2, and making the switching frequency variable, more specifically in dependence on the alternating current to be generated. In that respect, the switching frequency is at a maximum, that is to say the pulse duty cycle is at a minimum, in the region of the passage-through-zero of the alternating current produced; the switching frequency is at a minimum, that is to say the pulse duty cycle is at a maximum, in the region of the maximum amplitudes of the alternating current.

It was possible to find that, with such a pulse inverter, the switching losses of the power semiconductors can be minimised, which results in a drastic reduction in the power loss, and that the current which is to be fed in has a very high fundamental oscillation content without troublesome harmonics. In addition, as there is not a pronounced fixed switching frequency, no troublesome resonance phenomena occur when a plurality of wind power installations are switched in parallel relationship, which results in a further relative improvement in the fundamental oscillation content. While, with previous pulse inverters, a static switching frequency was accepted and attempts were made to optimise matters in the region of the switching times of the switches S1 and S2 in order to reduce the power loss and to minimise the harmonics content, the invention also proposes optimising the switching frequency of the pulse inverter, in which case the switching frequency changes in dependence on the sinusoidal current which is to be fed in. The configuration of the variable switching frequency is shown in simplified form in FIG. 3b.

BRIEF DESCRIPTION OF THE DRAWINGS

The invention is described in greater detail hereinafter by means of an embodiment illustrated in the drawing in which.

DETAILED DESCRIPTION OF THE INVENTION

Figure 1:
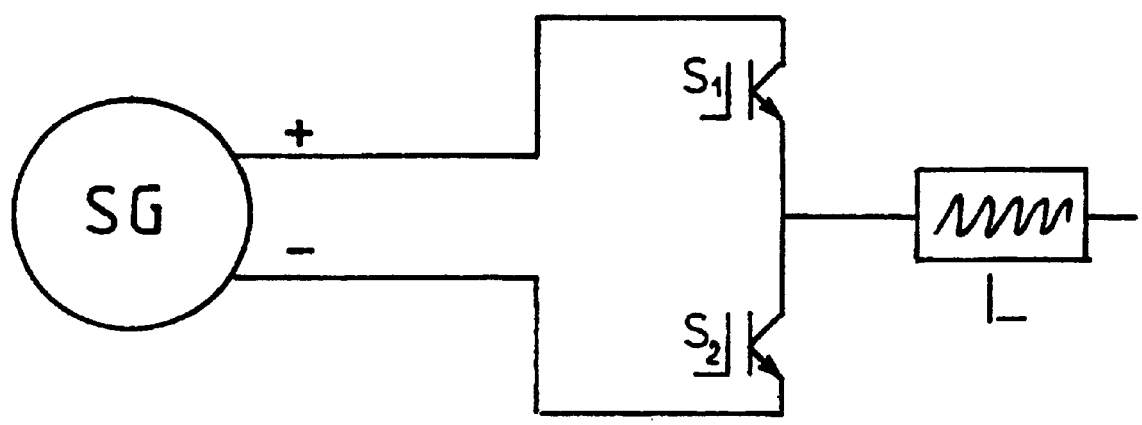
FIG. 1 is a circuit diagram showing the principle of a pulse inverter.

FIG. 1 shows a switch S1 an da switch S2 and an inductor L connected on the output side thereof. The switch S1 is connected to the positive terminal of the dc voltage supplied and the switch S2 is connected to the negative terminal.

Figure 2:
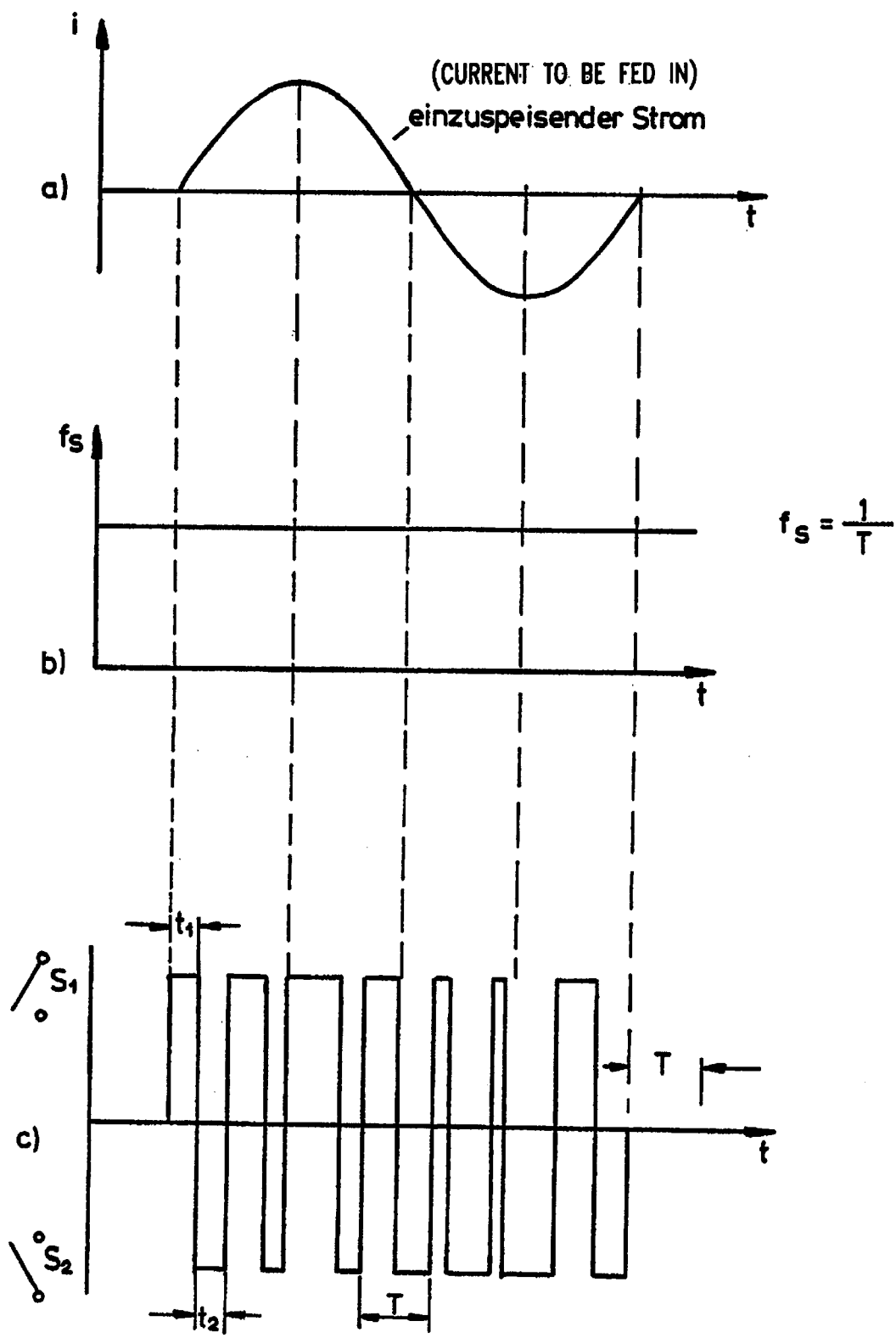
FIG. 2 shows a wiring diagram a), a switching frequency diagram b) and a switching-on and switching-off diagram c) in respect of the switches S1 and S2.

FIG. 2 shows in a) the result of pulse inversion in the case of a known pulse inverter as shown in FIG. 1. In this case, the switching frequency $f_s$ or the inverse of the switching frequency, the pulse duty cycle T, as shown in FIG. 2b), is constant. Within a cycle, one switch S1 is switched on for a period t1 and one switch S2 is switched on for a period t2. By suitable presettings of and variations in the switching durations t1 and t2 or the corresponding switch-off times of the switches S1 and S2, sinusoidal alternating current—see FIG. 2a)—can be generated from the direct current supplied. The sinusoidal configuration can be optimised by optimising the switching times t1 to t2 within the switching period T. The switch-on and switch-off configuration shown in FIG. 2 is only shown in greatly simplified form, for reasons of clarity of the drawing. The switching frequency is however limited by the power loss $P_v$ of the pulse inverter. The power loss $P_v$ increases with an increasing switching frequency. The power loss $P_v$ admittedly decreases with decreasing switching frequency, but then the content of harmonics increases, which can result in mains incompatibilities.

Figure 3:
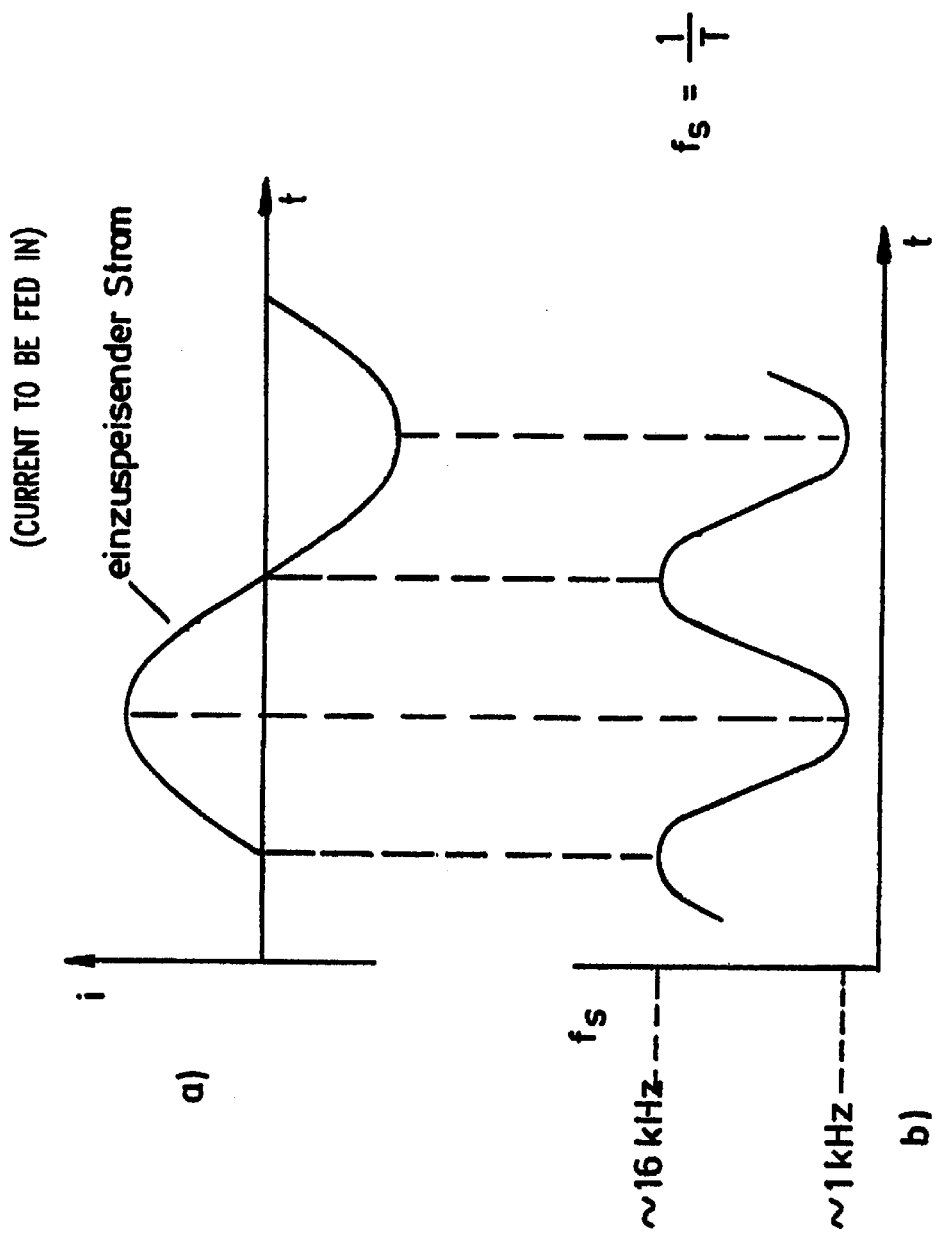
FIG. 3 shows a wiring diagram and a switching frequency diagram of a pulse inverter according to the invention.

It will be seen from FIG. 3 at 3b) that the switching frequency for the current i which is to be fed in, in FIG. 3a), is adapted to be variable, and that the switching frequency is at a maximum in the region of the passages-through-zero of the alternating current i to be produced and at a minimum in the region of the maximum amplitudes of the alternating current i to be produced. In the region of the maximum amplitudes of the alternating current i to be produced the switching frequency $f_s$ is about 16 kHz at the maximum and about 1 kHz at the minimum. The variability of the switching frequency provides that in the region of the passages-through-zero, the alternating current to be produced is produced in virtually coincident relationship with the ideal sinusoidal curve and that in the region of the maximum amplitudes, the alternating current produced has a greater harmonics component than in the region of the passages-through-zero. Overall however the content of harmonics is at a minimum and is practically zero in the region of the passages-through-zero.

If now a plurality of wind power installations with a synchronous generator and a corresponding pulse inverter with a control as shown in FIG. 3b) are connected in parallel, this does not involve a pronounced fixed switching frequency which causes problems—as hitherto—, and the variable switching frequency provides that there are no troublesome resonance phenomena between the individual wind power installations so that the fundamental oscillation content is overall significantly improved in a parallel connection of a plurality of wind power installations.

Figure 4:
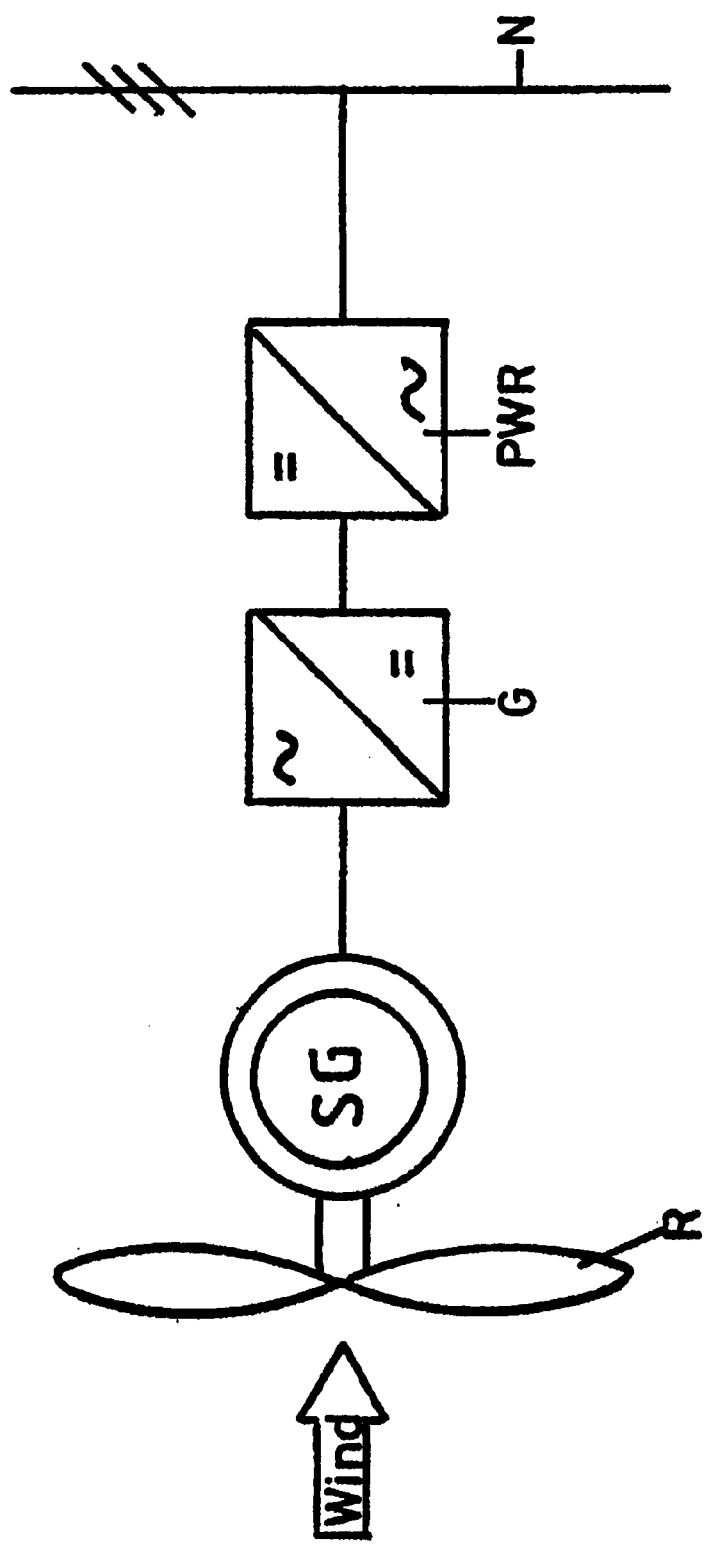
FIG. 4 is a circuit diagram showing the principle of a wind power installation with a directly driven, variable-speed synchronous generator.
Figure 5:
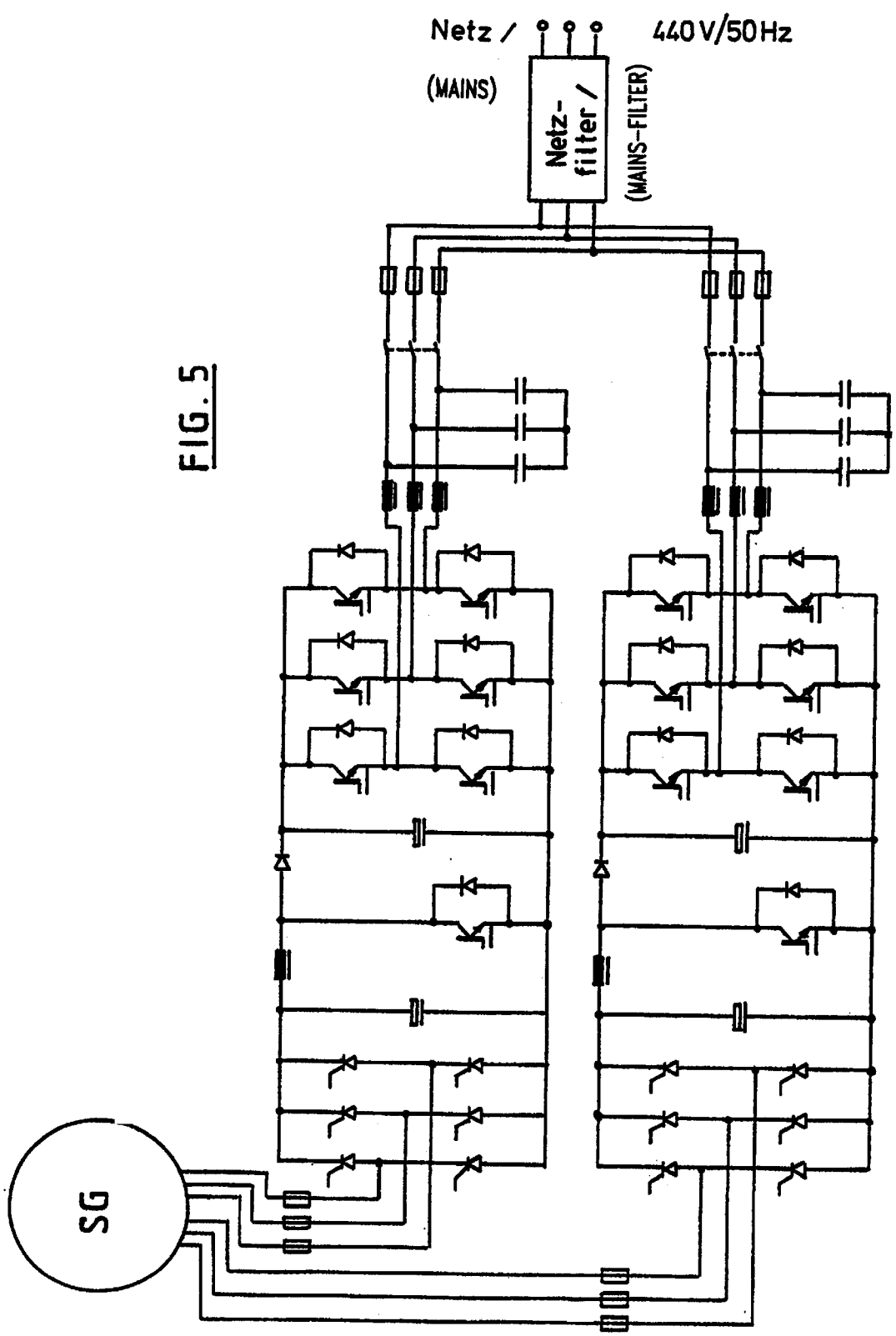
FIG. 5 shows a block circuit diagram of an inverter of an E-40 wind power installation.

FIG. 4 is a circuit diagram illustrating the principle of a variable-speed synchronous generator SG driven by a rotor R, with an output-side rectifier G and a pulse inverter PWR—see FIG. 5—as is known for example in the wind power installation ENERCON of type 'E-40'. The synchronous machine in the case of the generator developed for the type 'E-4' is an electrically excited synchronous machine with 84 poles. The diameter is about 4.8 m.

The total losses with the frequency inverter with an actuating configuration as shown in FIG. 2 are still about 2.5% of the total electrically generated power, in the case of the known 'E-40' wind power installation. Those losses can be considerably reduced by over 30% or more by means of the invention, while the mains feed can still be practically oscillation-free.

From the foregoing, it will be appreciated that although embodiments of the invention have been illustrated and described, various modifications can be made without departing from the spirit of the invention. Thus, the present invention is not limited to the embodiments described herein, but rather is defined by the claims which followed.

What is claimed is:

1. A pulse inverter with variable pulse frequency for producing a sinusoidal alternating current, characterised in that the pulse frequency variation is dependent on the configuration of the alternating current to be produced, wherein the pulse frequency at the passage-through-zero of the alternating current to be produced is a multiple greater than in the region of the maximum amplitude of the alternating current, and the lowest pulse frequency in the region of the maximum amplitude of the alternating current is at least some 100 Hz.

2. A pulse inverter according to claim 1 characterised in that the pulse frequency in the region of the passage-through-zero of the alternating current to be produced is in the range of about 14–18 kHz and in the region of the maximum amplitudes of the current it is about 500 Hz to 2 kHz.

3. A wind power installation with a pulse inverter according to claim 1 or claim 2.

4. An arrangement of a plurality of wind power installations according to claim 3 which are connected in mutually parallel relationship.

5. A parallel connection of a plurality of pulse inverters according to claim 1 or claim 2.

* * * * *